United States Patent
Williams, Jr.

(10) Patent No.: US 7,600,740 B2
(45) Date of Patent: Oct. 13, 2009

(54) THERMALLY COMPENSATED MOUNTING FLANGE AND METHOD OF USE

(75) Inventor: John B. Williams, Jr., Houston, TX (US)

(73) Assignee: Mogas Industries, Inc., Houston, TX (US)

( * ) Notice: Subject to any disclaimer, the term of this patent is extended or adjusted under 35 U.S.C. 154(b) by 457 days.

(21) Appl. No.: 11/627,825

(22) Filed: Jan. 26, 2007

(65) Prior Publication Data

US 2007/0177933 A1  Aug. 2, 2007

Related U.S. Application Data

(60) Provisional application No. 60/766,572, filed on Jan. 27, 2006.

(51) Int. Cl.
*F16K 51/00* (2006.01)
(52) U.S. Cl. ........................ 251/291; 251/368
(58) Field of Classification Search ............... 251/291, 251/292, 366, 367, 368; 248/243
See application file for complete search history.

(56) References Cited

U.S. PATENT DOCUMENTS

| | | | | |
|---|---|---|---|---|
| 1,893,123 A | * | 1/1933 | Beth | 432/241 |
| 3,406,931 A | * | 10/1968 | Notbohm | 248/646 |
| 3,507,082 A | * | 4/1970 | Heirich | 248/222.51 |
| 3,648,718 A | * | 3/1972 | Curran | 251/282 |
| 4,313,595 A | * | 2/1982 | Markley et al. | 251/369 |
| 4,331,316 A | * | 5/1982 | Jandrasi | 251/86 |
| 4,363,504 A | * | 12/1982 | De Feo et al. | 285/47 |
| 4,633,897 A | * | 1/1987 | Effenberger | 251/291 |
| 6,742,765 B2 | * | 6/2004 | Takano et al. | 251/292 |
| 6,848,672 B2 | * | 2/2005 | Cross et al. | 251/292 |

* cited by examiner

*Primary Examiner*—John Bastianelli
(74) *Attorney, Agent, or Firm*—Daniel N. Lundeen; Lundeen & Lundeen, PLLC

(57) ABSTRACT

A thermally compensated mounting flange 10 useful for mechanically attaching equipment to a device which can be operated at a relatively high temperature is disclosed, such as an actuator 32 to operate valve 12. The mounting flange 10 and valve 12 can be made of different materials with unequal thermal expansion coefficients. The mounting flange 10 has a flange portion 14 and one or more legs 16A,16B extending from the flange portion 14 to a distal end mechanically secured to the valve 12. At least one pin 36 can be disposed through an attachment bore 22,24,26 in a leg 16A,16B and into or through the body of valve 12. An open-ended slot 30 is formed from the distal end and terminates at an aperture 28 spaced from a periphery of a leg 16A,16B. Aperture 28 can conveniently serve as a sight hole for inspection of the top of valve 12.

22 Claims, 3 Drawing Sheets

THERMALLY COMPENSATED MOUNTING FLANGE AND METHOD OF USE

CROSS-REFERENCE TO RELATED APPLICATION

This application claims the benefit of U.S. Provisional Patent Application No. 60/766,572 filed Jan. 27, 2006.

FIELD OF THE INVENTION

The present invention relates to mounting flanges useful for mounting equipment to a mechanical device having a different rate of expansion, and more particularly to such a flange having one or more thermally compensated legs.

BACKGROUND OF THE INVENTION

Valves with mechanically attached, e.g., bolted-on, mounting flanges are well known. Mounting flanges can be used to attach a variety of equipment to the valve, such as, for example, a gear or actuator for operating a stem to open and/or close the valve. Some valve bodies are made of relatively expensive materials such as titanium, and it may be desired to employ a mounting flange made of a less expensive material such as steel or stainless steel, e.g., for economic reasons. For example, if the valve is used in high temperature service, the material of the mounting flange may have a thermal expansion coefficient that is different than the material of which the valve is made, resulting in excessive thermal stresses developing in the mounting flange which might lead to premature failure of the valve, mounting flange and/or any mechanical attachment to the valve, e.g., pins, bores, etc. Additional strength can be provided by welding the mounting flange directly to the valve; however, the thermal stresses can likewise lead to failure of the weld, valve, and/or mounting flange.

The present invention can provide a thermally compensated mounting flange that can reduce thermal stresses associated with the use of dissimilar materials in the construction of the mounting flange and/or the equipment to which it is mechanically secured, for example, in high temperature service.

SUMMARY OF THE INVENTION

The present invention provides a mounting flange supported from one or more legs that can be thermally compensated by forming a slot from a base of the leg to an enlarged central aperture spaced from the base.

In one embodiment, a thermally compensated mounting flange can mechanically attach equipment to a device wherein the thermally compensated mounting flange and the device have different thermal expansion coefficients. A thermally compensated mounting flange can include a flange portion, one or more legs extending from the flange portion to a distal end mechanically securable to the device, and an open-ended slot formed from the distal end of the one or more legs and terminating at an aperture spaced from a periphery of the one or more legs. The flange portion can be a generally flat annular plate. At least one of the one or more legs can be a flat plate. The open-ended slot in the one or more legs can be formed along a longitudinal centerline of the one or more legs.

In another embodiment, an assembly of a thermally compensated mounting flange and a device, wherein the thermally compensated mounting flange and the device have different thermal expansion coefficients, can include a flange portion, one or more legs extending from the flange portion to a distal end mechanically secured to the device, and an open-ended slot formed from the distal end of the one or more legs and terminating at an aperture spaced from a periphery of the one or more legs. The device can be a valve. A stem of the valve can extend through a central opening in the flange portion. An actuator can be attached to the flange portion and/or connected to the stem of the valve. The distal end of the one or more legs can be received in a longitudinal recess formed in the valve. The one or more legs can be an opposing pair of legs. The one or more legs can be mechanically secured to the valve by at least one pin passing through an attachment bore in the distal end of the one or more legs intersected by the open-ended slot and into the valve. A diameter of the pin can be selected to permit full closure of the open-ended slot under thermal stress conditions. Additionally or alternatively, the one or more legs can be mechanically secured to the valve via a pair of pins each received in corresponding bores formed in the one or more legs and formed in the valve. The pair of pins can be disposed on opposing sides of the open-ended slot. The aperture can be a sight hole, e.g., to view an area between the flange portion and the valve.

In yet another embodiment, a method of forming a thermally compensated connection between equipment and a device with a mounting flange, wherein the mounting flange and the device have different thermal expansion coefficients, can include attaching a flange portion of the mounting flange to the equipment, mechanically securing a distal end of one or more legs extending from the mounting flange to the device, and providing an open-ended slot extending from the distal end of the one or more legs and terminating at an aperture spaced from a periphery of the one or more legs. The device can be a valve. The equipment can be an actuator. The actuator can be connected to a stem of the valve. The open-ended slot in the one or more legs can be formed along a longitudinal centerline of the one or more legs. The mechanically securing step can include inserting a pin through an attachment bore in the one or more legs intersected by the open-ended slot and into the valve. The method of forming a thermally compensated connection can include selecting the pin to have a diameter that permits full closure of the open-ended slot under thermal stress conditions. Additionally or alternatively, the mechanically securing step can include inserting a pair of pins into corresponding bores formed in the one or more legs and formed in the valve. The pair of pins can be disposed on opposing sides of the open-ended slot. The method can also include using the aperture as a sight hole, e.g. to view an area between the flange portion and the device.

DETAILED DESCRIPTION

Figure 1:
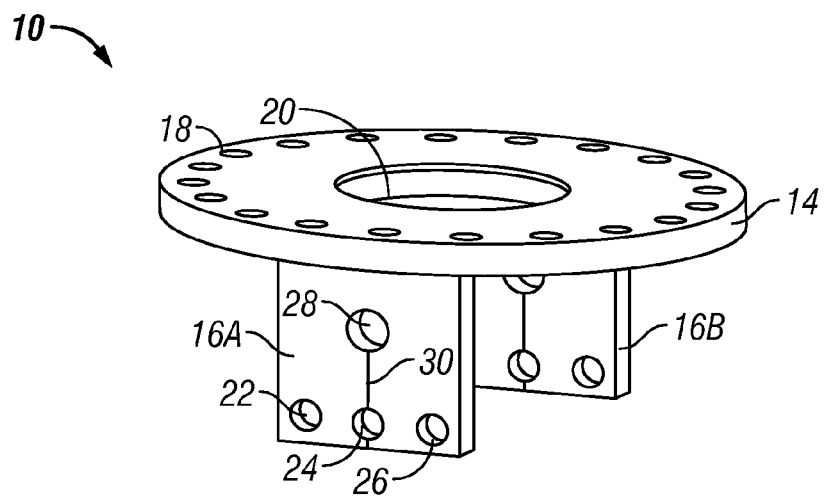
FIG. 1 is a perspective view of one embodiment of a thermally compensated mounting flange of the present invention.
Figure 2:
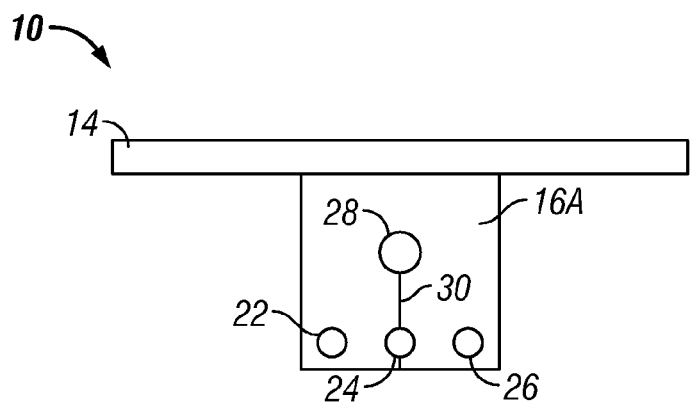
FIG. 2 is a side view of the thermally compensated mounting flange of FIG. 1.

Referring now to the drawings, one embodiment of a thermally compensated mounting flange 10 of the present invention is illustrated in FIGS. 1-4. As will hereinafter be more fully described, a thermally compensated mounting flange 10 can be utilized with a high temperature valve 12 (see FIGS. 5-6), for example, wherein the mounting flange 10 is made of a material such as stainless steel which has a different rate of thermal expansion than the material of the body of the valve 12 such as titanium, i.e., materials having different thermal expansion coefficients. The present invention is not limited, however, to any particular materials of construction for the mounting flange or valve, or for that matter to use with a valve, and will have applicability for a mounting flange mechanically secured to any device wherein the mounting flange and the device have different rates of thermal expansion.

Figure 3:
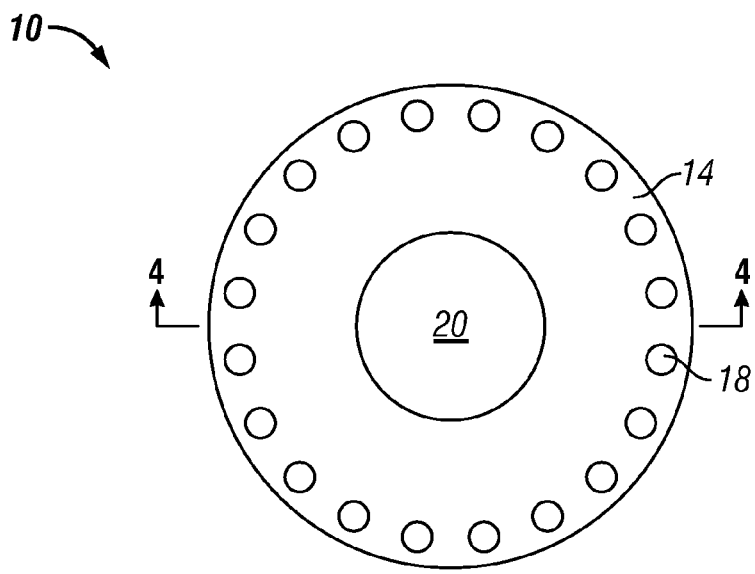
FIG. 3 is a top plan view of the thermally compensated mounting flange of FIGS. 1-2.
Figure 4:
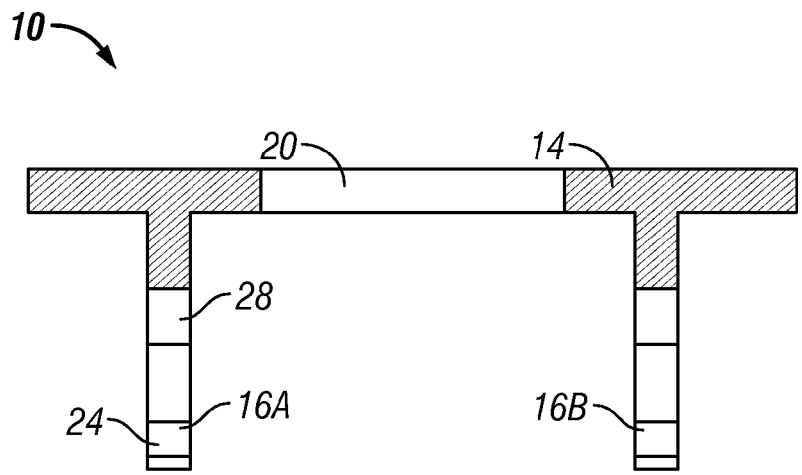
FIG. 4 is a cross-sectional view of the thermally compensated mounting flange of FIGS. 1-3 along lines 4-4.

In the embodiment of FIGS. 1-4, mounting flange 10 includes a flange portion 14 and an opposing pair of legs 16A,16B. Mounting flange 10 can be forged, cast, welded, milled, machined, and/or otherwise fabricated, for example, using conventional construction methods and equipment. Flange portion 14 can be a generally flat annular plate and can include a plurality of preferably equally spaced bolt holes 18 arranged in a circle near an outside diameter. Flange portion 14 can include a central opening 20. The outside diameter, circle of bolt holes 18 and central opening 20 of the flange portion 14 can be coaxial. Bolt holes 18 can straddle centerlines drawn parallel and at a right angle to the major planes of the legs 16A,16B, for example, as shown in FIG. 3.

A leg 16A,16B can be a flat plate attached to flange portion 14. In the embodiment of FIGS. 1-4, the major planes of legs 16A,16B are tangential to a radius of the circular flange portion 14. Attachment bore(s) 22,24,26 of a suitable diameter can be included for mechanical attachment, e.g. by pins or the like received through the attachment bores and corresponding bores (not shown) in the attached device, e.g., valve 12 in FIG. 5. Attachment bores 22,24,26 can be equidistantly spaced from the distal edge of a leg 16A,16B. An attachment bore 22,24,26 can be formed adjacent to a distal edge of a leg 16A,16B. Attachment bore 24 can be formed along a longitudinal centerline of a leg 16A,16B. A pair of bores 22,26 can be equally spaced on either side of longitudinal centerline of a leg 16A,16B and adjacent opposite lateral edges of the leg. A sight hole 28 of a suitable diameter for viewing through it, e.g., 2 inches in diameter, can be included, for example, along the longitudinal centerline of a leg 16A,16B. Sight hole 28 can be formed approximately halfway between the center of bore 24 and the flange portion 14 or slightly closer to the flange portion 14.

A slot 30 can be formed, for example, as a saw cut with a 0.030 to 0.060-inch blade, along the longitudinal centerline through the central attachment bore 24, if present, and into sight hole 28. The slot 30 and sight hole 28 can substantially relieve the magnitude of the stresses on the legs 16A,16B and/or any pins extending through attachment bores 22,24,26 that could otherwise develop due to differential thermal expansion between the legs 16A,16B and an attached device, e.g., valve 12.

Figure 5:
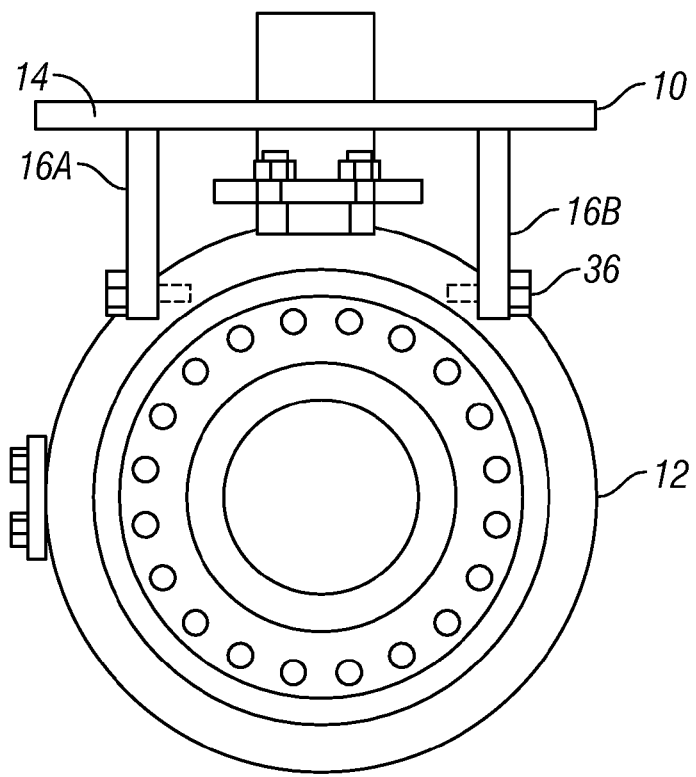
FIG. 5 is an end view of an assembly of the thermally compensated mounting flange of FIGS. 1-4 and a valve, according to one embodiment of the invention.

In use, thermally compensated mounting flange 10 can be secured to a device, e.g., a valve 12 as shown in FIG. 5. Pins (not shown in FIG. 5) can be inserted through any attachment bores 22,24,26 in a leg 16A,16B and into a corresponding bore, e.g., a threaded bore or a blind tap, formed in the body of the valve 12. A pin can be inserted through an attachment bore 22,24,26 in one leg 16A,16B on either side of the valve stem and a corresponding through bore formed through the body of the valve 12 so that the opposite end of the pin is received in a corresponding bore 22,24,26 on an opposing leg 16A,16B. A pin can be non-threaded or threaded, for example, a screw, bolt, or the like. The end of a pin, e.g., a non-threaded pin, can be tightly received in at least a bore 22,24,26 in a leg 16A,16B and/or tightly received in any corresponding attachment bore in the valve, including a through bore, e.g. 1.375-in. diameter pins in 1.376- to 1.377-in. bores 22,26. If desired, longitudinal recesses can be formed in the body of the valve 12 with a matching profile to receive the corresponding distal ends of the respective legs 16A,16B.

A threaded pin 36, e.g., a screw 36, can be threadedly received in a corresponding bore, e.g., a threaded bore or a blind tap as shown in dotted lines in FIG. 5, formed in the body of the valve 12 to correspond with respective central attachment bore 24, however a non-threaded pin can be utilized. Alternatively or additionally, a through pin 36, e.g., through bolt, (not shown) can be used where the geometry of the valve body permits a bore to be formed entirely therethrough the valve and extend between each of the legs 16A, 16B. Pin 36, e.g., threaded screw or bolt, can have a diameter slightly less than the diameter of attachment bore 24, e.g., 1.25-in. diameter pin 36 in 1.376-in. bore 24, so as not to impede closure of the slot 30 under thermal stress conditions. Thermally compensated mounting flange 10 can thus be positioned so that the stem of the valve 12 extends through the central opening 20 and/or can conveniently be viewed between the flange portion 14 and the body of the valve 12 via sight hole 28 to facilitate inspection and/or servicing of the packing, packing gland and/or stem.

Figure 6:
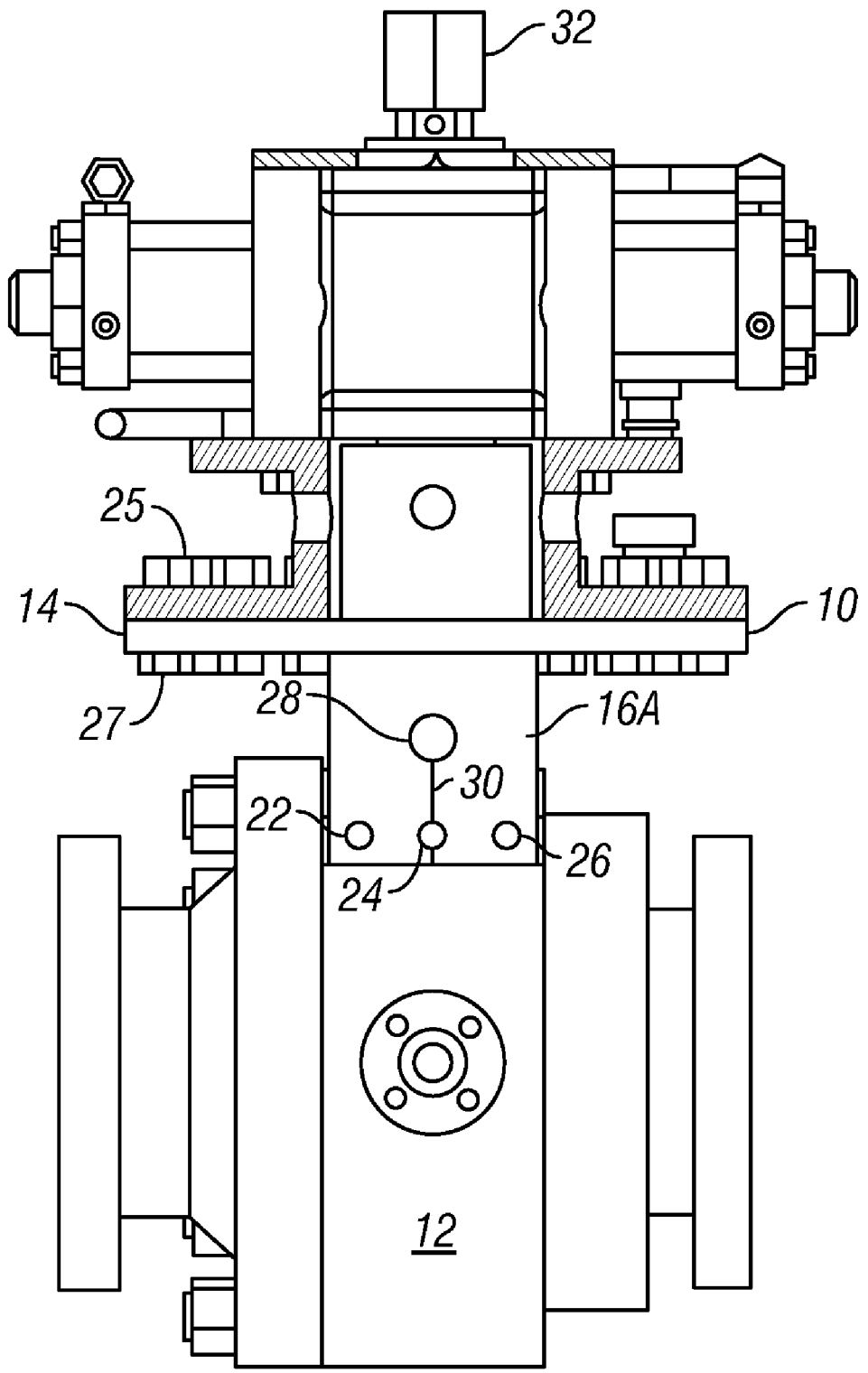
FIG. 6 is a side view of the assembly of FIG. 5 further including a valve actuator secured to the thermally compensated mounting flange, according to one embodiment of the invention.

As illustrated in the embodiment in FIG. 6, a standard actuator 32 or other stem rotating or operating equipment can be conventionally secured to a thermally compensated mounting flange 10 having legs 16A,16B providing an open-ended slot 30 extending from the distal end thereof and terminating at an aperture 28. The actuator 32 can have a flange with a bolt circle that matches the corresponding bolt circle of the mounting flange 10 so that bolts 25 can be received in the bolt holes 18 and threadedly secured with nuts 27, for example. The actuator 32 can thus be secured firmly in position to operate the stem of the valve 12 so that the mounting flange 10 can inhibit any misalignment, e.g., axially and/or radially, with the stem that might otherwise occur if the attachment of the mounting flange 10 to the valve 12 were not thermally compensated, and can thereby minimize stem leakage and enhance packing operation and life.

What is claimed is:

1. A thermally compensated mounting flange to mechanically attach equipment to a device wherein the thermally compensated mounting flange and the device have different thermal expansion coefficients, comprising:
   a flange portion;
   one or more legs extending from the flange portion to a distal end mechanically securable to the device; and
   an open-ended slot formed from the distal end of the one or more legs and terminating at an aperture spaced from a periphery of the one or more legs wherein the one or more legs is mechanically secured to the device by at least one pin passing through an attachment bore of the one or more legs intersected by the open-ended slot and into the device.

2. The thermally compensated mounting flange of claim 1 wherein the flange portion comprises a generally flat annular plate.

3. The thermally compensated mounting flange of claim 1 wherein at least one of the one or more legs comprises a flat plate.

4. The thermally compensated mounting flange of claim 1 wherein the open-ended slot in the one or more legs is formed along a longitudinal centerline thereof.

5. An assembly of a thermally compensated mounting flange and a device wherein the thermally compensated mounting flange and the device have different thermal expansion coefficients, comprising:
 a flange portion;
 one or more legs extending from the flange portion to a distal end mechanically secured to the device; and
 an open-ended slot formed from the distal end of the one or more legs and terminating at an aperture spaced from a periphery of the one or more legs wherein the one or more legs is mechanically secured to the device by at least one pin passing through an attachment bore of the one or more legs intersected by the open-ended slot and into the device.

6. The assembly of claim 5 wherein the device comprises a valve.

7. The assembly of claim 6 wherein a stem of the valve extends through a central opening in the flange portion.

8. The assembly of claim 7 further comprising an actuator attached to the flange portion and connected to the stem of the valve.

9. The assembly of claim 6 wherein the distal end of the one or more legs is received in a longitudinal recess formed in the valve.

10. The assembly of claim 6 wherein the one or more legs comprises an opposing pair of legs.

11. The assembly of claim 6 wherein a diameter of the pin is selected to permit full closure of the open-ended slot under thermal stress conditions.

12. The assembly of claim 6 wherein the one or more legs is further mechanically secured to the valve via a pair of pins each received in corresponding bores formed in the one or more legs and formed in the valve, the pair of pins disposed on opposing sides of the open-ended slot.

13. The assembly of claim 6 wherein the one or more legs is mechanically secured to the valve via a pair of pins each received in corresponding bores formed in the one or more legs and formed in the valve, the pair of pins disposed on opposing sides of the open-ended slot.

14. The assembly of claim 6 wherein the aperture comprises a sight hole to view an area between the flange portion and the valve.

15. A method of forming a thermally compensated connection between equipment and a device with a mounting flange wherein the mounting flange and the device have different thermal expansion coefficients, comprising:
 attaching a flange portion of the mounting flange to the equipment;
 mechanically securing a distal end of one or more legs extending from the mounting flange to the device; and
 providing an open-ended slot extending from the distal end of the one or more legs and terminating at an aperture spaced from a periphery of the one or more legs wherein the mechanically securing step comprises inserting a pin through an attachment bore in the one or more legs intersected by the open-ended slot and into the valve.

16. The method of claim 15 wherein the device comprises a valve.

17. The method of claim 16 wherein the equipment comprises an actuator connected to a stem of the valve.

18. The method of claim 15 wherein the open-ended slot in the one or more legs is formed along a longitudinal centerline thereof.

19. The method of claim 16 further comprising selecting the pin to have a diameter that permits full closure of the open-ended slot under thermal stress conditions.

20. The method of claim 19 wherein the mechanically securing step further comprises inserting a pair of pins into corresponding bores formed in the one or more legs and formed in the valve, the pair of pins disposed on opposing sides of the open-ended slot.

21. The method of claim 16 wherein the mechanically securing step comprises inserting a pair of pins into corresponding bores formed in the one or more legs and formed in the valve, the pair of pins disposed on opposing sides of the open-ended slot.

22. The method of claim 16 further comprising viewing an area between the flange portion and the device using the aperture as a sight hole.

* * * * *